(12) United States Patent
Cronin (10) Patent No.: US 9,294,575 B1
(45) Date of Patent: Mar. 22, 2016

(54) TRANSMITTING APPLIANCE-SPECIFIC CONTENT TO A USER DEVICE

(71) Applicant: OTO Technologies LLC, Charleston, SC (US)

(72) Inventor: John Cronin, Bonita Springs, FL (US)

(73) Assignee: GRANDIOS TECHNOLOGIES, INC., Charleston, SC (US)

(*) Notice: Subject to any disclaimer, the term of this patent is extended or adjusted under 35 U.S.C. 154(b) by 102 days.

(21) Appl. No.: 14/308,411

(22) Filed: Jun. 18, 2014

Related U.S. Application Data (60) Provisional application No. 62/007,849, filed on Jun. 4, 2014.

(51) Int. Cl.
  *G06F 15/173* (2006.01)
  *H04L 29/08* (2006.01)
  *H04L 12/28* (2006.01)

(52) U.S. Cl.
  CPC .............. *H04L 67/20* (2013.01); *H04L 12/281* (2013.01); *H04L 12/282* (2013.01); *H04L 12/2807* (2013.01); *H04L 12/2809* (2013.01);
  (Continued)

(58) Field of Classification Search
  CPC ............ H04L 12/2807; H04L 12/2809; H04L 12/281; H04L 12/2812; H04L 12/2814; H04L 12/282; H04L 12/2823; H04L 12/2827; H04L 12/2829
  USPC .......................................................... 709/226
  See application file for complete search history.

(56) References Cited

U.S. PATENT DOCUMENTS 6,882,712 B1 * 4/2005 Iggulden et al. ......... 379/102.03
8,281,357 B2   10/2012 Chiba et al.
(Continued)

FOREIGN PATENT DOCUMENTS

WO   WO 2013/008252   1/2013

OTHER PUBLICATIONS

16 of the Coolest Smartphone Connected Appliances (list) >> Gadget Review—Date of download: Dec. 31, 2013 http://www.gadgetreview.com/2013/01/16-of-the-coolest-smartphone-connected-appliance.html.
(Continued)

*Primary Examiner* — Ario Etienne
*Assistant Examiner* — Blake Rubin
(74) *Attorney, Agent, or Firm* — Polsinelli LLP (57) ABSTRACT

Methods and systems are presented for transmitting appliance-specific content to a user device associated with an appliance. In some embodiments, a third party platform may serve as a secure intermediary between a user device associated with an appliance (e.g., an oven) and a third party appliance service provider (e.g., appliance manufacturer). In some embodiments, the third party platform database may store appliance ownership data from the user device and compare an appliance search provided by the appliance service provider with the appliance ownership data in order to match an appliance service provider with a user device associated with an appliance meeting the criteria of the appliance search. The appliance service provider may efficiently transmit appliance-specific content (e.g., a list of approved or preferred appliance servicers) to the appliance user by way of the appliance user's user device. In some embodiments, the data exchange facilitated by the third party platform may be customized based on user-specified appliance center settings.

19 Claims, 6 Drawing Sheets

(52) U.S. Cl.
CPC ........ *H04L12/2812* (2013.01); *H04L 12/2823* (2013.01); *H04L 12/2827* (2013.01); *H04L 12/2829* (2013.01)

(56) References Cited

U.S. PATENT DOCUMENTS

| | | | |
|---|---|---|---|
| 8,443,071 | B2 | 5/2013 | Lu et al. |
| 8,589,667 | B2 | 11/2013 | Mujtaba et al. |
| 8,611,930 | B2 | 12/2013 | Louboutin et al. |
| 8,620,344 | B2 | 12/2013 | Huang et al. |
| 8,626,465 | B2 | 1/2014 | Moore et al. |
| 8,630,216 | B2 | 1/2014 | Deivasigamani et al. |
| 8,660,501 | B2 | 2/2014 | Sanguinetti |
| 8,706,044 | B2 | 4/2014 | Chang et al. |
| 8,724,723 | B2 | 5/2014 | Panicker et al. |
| 8,750,207 | B2 | 6/2014 | Jeong et al. |
| 8,793,094 | B2 | 7/2014 | Tam et al. |
| 8,816,868 | B2 | 8/2014 | Tan et al. |
| 8,831,529 | B2 | 9/2014 | Toh et al. |
| 8,831,655 | B2 | 9/2014 | Burchill et al. |
| 8,836,851 | B2 | 9/2014 | Brunner |
| 8,843,158 | B2 | 9/2014 | Nagaraj |
| 8,849,308 | B2 | 9/2014 | Marti et al. |
| 8,862,060 | B2 | 10/2014 | Mayor |
| 8,873,418 | B2 | 10/2014 | Robinson et al. |
| 8,874,090 | B2 | 10/2014 | Abuan et al. |
| 8,917,632 | B2 | 12/2014 | Zhou et al. |
| 8,934,921 | B2 | 1/2015 | Marti et al. |
| 2004/0117788 | A1* | 6/2004 | Karaoguz et al. ............ 717/177 |
| 2004/0117845 | A1* | 6/2004 | Karaoguz et al. ............ 725/134 |
| 2008/0104212 | A1* | 5/2008 | Ebrom et al. ................ 709/242 |
| 2008/0109310 | A1* | 5/2008 | Ebrom et al. ................. 705/14 |
| 2008/0125911 | A1* | 5/2008 | Ebrom et al. ................ 700/275 |
| 2009/0067411 | A1* | 3/2009 | Heidermark et al. ........ 370/352 |
| 2009/0067441 | A1* | 3/2009 | Ansari et al. ................ 370/401 |
| 2011/0040785 | A1* | 2/2011 | Steenberg et al. .......... 707/769 |
| 2011/0291971 | A1* | 12/2011 | Masaki et al. ............... 345/173 |
| 2012/0066286 | A1* | 3/2012 | Heredia et al. .............. 709/201 |
| 2012/0084472 | A1* | 4/2012 | Locascio et al. ............ 710/104 |
| 2012/0262628 | A1* | 10/2012 | Wilson et al. ............... 348/552 |
| 2013/0038800 | A1* | 2/2013 | Yoo ............................. 348/734 |
| 2013/0063065 | A1* | 3/2013 | Berman et al. .............. 318/480 |
| 2013/0065579 | A1 | 3/2013 | Gao et al. |
| 2013/0069985 | A1 | 3/2013 | Wong et al. |
| 2013/0173811 | A1 | 7/2013 | Ha et al. |
| 2013/0214935 | A1 | 8/2013 | Kim et al. |
| 2013/0303192 | A1 | 11/2013 | Louboutin |
| 2013/0317835 | A1 | 11/2013 | Mathew |
| 2013/0328917 | A1 | 12/2013 | Zhou |
| 2013/0331087 | A1 | 12/2013 | Shoemaker |
| 2013/0331118 | A1 | 12/2013 | Chhabra |
| 2013/0331137 | A1 | 12/2013 | Burchill |
| 2013/0332108 | A1 | 12/2013 | Patel |
| 2013/0332156 | A1 | 12/2013 | Tackin |
| 2014/0062773 | A1 | 3/2014 | MacGougan |
| 2014/0065962 | A1 | 3/2014 | Le |
| 2014/0068027 | A1* | 3/2014 | Flacco et al. ................ 709/220 |
| 2014/0071221 | A1 | 3/2014 | Dave |
| 2014/0081433 | A1* | 3/2014 | Cheong et al. ................ 700/90 |
| 2014/0105084 | A1 | 4/2014 | Chhabra |
| 2014/0139380 | A1 | 5/2014 | Ouyang |
| 2014/0141803 | A1 | 5/2014 | Marti |
| 2014/0162628 | A1 | 6/2014 | Bevelacqua |
| 2014/0167794 | A1 | 6/2014 | Nath |
| 2014/0168170 | A1 | 6/2014 | Lazarescu |
| 2014/0171114 | A1 | 6/2014 | Marti |
| 2014/0180820 | A1 | 6/2014 | Louboutin |
| 2014/0191979 | A1 | 7/2014 | Tsudik |
| 2014/0200053 | A1 | 7/2014 | Balasubramanian |
| 2014/0222335 | A1 | 8/2014 | Piemonte |
| 2014/0232633 | A1 | 8/2014 | Shultz |
| 2014/0232634 | A1 | 8/2014 | Piemonte |
| 2014/0247279 | A1 | 9/2014 | Nicholas |
| 2014/0247280 | A1 | 9/2014 | Nicholas |
| 2014/0269562 | A1 | 9/2014 | Burchill |
| 2014/0274150 | A1 | 9/2014 | Marti |
| 2014/0283135 | A1 | 9/2014 | Shepherd |
| 2014/0293959 | A1 | 10/2014 | Singh |
| 2014/0364089 | A1 | 12/2014 | Lienhart |
| 2014/0364148 | A1 | 12/2014 | Block |
| 2014/0365120 | A1 | 12/2014 | Vulcano |
| 2015/0011242 | A1 | 1/2015 | Nagaraj |
| 2015/0026623 | A1 | 1/2015 | Horne |
| 2015/0031397 | A1 | 1/2015 | Jouaux |

OTHER PUBLICATIONS

"APPS rEVOLUTION", Point of View, CSC, Oct. 2013.
Android Apps for Controlling Home Lighting, Appliances, Thermostats and More; Date of download: Dec. 31, 2013 http://www.smarthome.com/adroid_apps.html.
Baig, F.; "Smart Home Energy Management System for Monitoring and Scheduling of Home Appliances Using Zigbee", J. Basic Appl. Sci. Res., © 2013, TextedRoad Publication.
Elgan, Mike; "On the Internet, Nobody Knows You're a Lamp", Mar. 26, 2013. http://www.houzz.com/ideabooks/8890681/list/On-the-Internet--Nobody-Knows-You-re-a-Lamp.
"Home Automation & Home Control Solutions for Home Theaters or Whole-House Systems", [Creston Electronics, Inc.]; Date of download: Dec. 31, 2013 http://www.creston.com/markets/home_theater_and_whole_house_home_automation/.
Ramachandran, Sanjeev; "Let Your Smartphone Control Your Household Appliances From Now On", Device Magazine, Sep. 16, 2013, http://www.devicemag.com/2013/09/16/let-your-smartphone-control-your-household-appliances-from-now-on/.
Niccolai, James; "Samsun Smart Home aims to control TVs, refrigerators with a single app", Computerworld. Jan. 5, 2014.
"Panasonic to Expand Smart Home Appliance Lineup with Full-Scale Launch of Smart Cloud Services", Panasonic Aug. 21, 2012.
Prospect, Adam; "Control Your House From Your Smartphone With Revolv for iOS" Sep. 16, 2013 http://mashable.com/2013/09/16/smart-home-automation/.
"Samsung Smart Appliances", © 1995-2013 Samsung; Date of download: Dec. 31, 2013 http://www.samsung.com/us/smartappliances/.
"Smart Appliances Connected Home", GE Appliances; Date of download: Jul. 11, 2014.
"Smart Appliances: Discoger LG's Smart ThingQ Appliances", LG USA; Date of download: Jul. 11, 2014.

* cited by examiner

TRANSMITTING APPLIANCE-SPECIFIC CONTENT TO A USER DEVICE

CROSS-REFERENCE TO RELATED APPLICATIONS

The present invention claims priority benefit to U.S. provisional patent application No. 62/007,849 filed Jun. 4, 2014, the entirety of which is incorporated by reference.

BACKGROUND OF THE INVENTION

1. Field of the Invention

The present invention generally concerns appliance data on a user device. More particularly, the present invention concerns exchanging appliance data with third parties on a user device.

2. Description of the Related Art

Applications are commonly run on a smart phone or intelligent device (e.g., user device), and certain applications are dedicated to appliance connectivity (e.g., remote control and management of appliances). For example, existing applications may use an Internet connection to discover all Wi-Fi devices in a user's home. In another example, existing applications may remotely control the operation of Wi-Fi devices in a user's home by an application. Examples of appliances include stoves, refrigerators, televisions, laundry machines, air conditioners, and any other suitable appliances.

Existing appliance applications do not, however, manage appliance data and match a particular appliance with a third party appliance service provider in order to transmit appliance-specific content to the user device. There exists, therefore, a need to coordinate appliance ownership data stored on the user device and third party appliance service provider data so that information related to a particular appliance may be efficiently transmitted to a user device associated with the appliance.

SUMMARY OF THE CLAIMED INVENTION

Methods and systems are presented for transmitting appliance-specific content to a user device (e.g., a smartphone, tablet, or personal computer) associated with an appliance. In some embodiments, a third party platform may serve as a secure intermediary between a user device associated with an appliance (e.g., an oven) and a third party appliance service provider (e.g., appliance manufacturer). In some embodiments, the third party platform database may store appliance ownership data from the user device and compare an appliance search provided by the appliance service provider with the appliance ownership data in order to match an appliance service provider with a user device associated with an appliance meeting the criteria of the appliance search. The appliance service provider may efficiently transmit appliance-specific content (e.g., a list of approved or preferred appliance servicers) to the appliance user by way of the appliance user's user device. In some embodiments, the data exchange facilitated by the third party platform may be customized based on user-specified appliance center settings.

Various embodiments may include methods for transmitting appliance-specific content to a user device associated with an appliance. These methods may include receiving user input via a user interface of the user device, wherein the received user input includes appliance center settings. The methods may further include executing instructions stored in memory, wherein the execution of the instructions by the processor activates an appliance center feature on the user device based on the user input and stores the appliance center settings on a database of a third party platform. Such appliance center settings may be sent over a network from the user device. The execution of instructions by the processor may further retrieve appliance ownership data from the user device by the third party platform, wherein the appliance ownership data is retrieved based on the appliance center settings, and wherein the retrieved appliance ownership data is stored in the database. The execution of the instructions by the processor may further receive an appliance search at the third party platform, the appliance search transmitted from an appliance service provider, wherein the appliance search includes appliance-identifying information. The execution of the instructions by the processor may further compare the received appliance search and the retrieved appliance ownership data to identify a match between an appliance associated with the user device and the appliance service provider, and transmit appliance-specific content from the appliance service provider, wherein the appliance-specific content is sent by the third party platform to the user device, and wherein the appliance-specific content is transmitted based on the identified match.

Various embodiments may further include systems for transmitting appliance-specific content to a user device associated with an appliance. Such systems may include a user interface that receives user input, wherein the received user input includes appliance center settings, and a memory that stores instructions. The systems may further include a processor that executes the instructions stored in the memory to activate an appliance center feature on the user device based on the user input and to store the appliance center settings on a database of a third party platform, the appliance center settings sent over a network from the user device. The execution of the instructions by the processor may further retrieve appliance ownership data from the user device, by the third party platform, wherein the appliance ownership data is retrieved based on the appliance center settings, and wherein the retrieved appliance ownership data is stored in the database. The execution of the instructions by the processor may further receive an appliance search at the third party platform, the appliance search transmitted from an appliance service provider, wherein the appliance search includes appliance-identifying information. The execution of the instructions by the processor may further compare the received appliance search and the retrieved appliance ownership data to identify a match between an appliance associated with the user device and the appliance service provider, and transmit appliance-specific content from the appliance service provider, wherein the appliance-specific content is sent by the third party platform to the user device, and wherein the appliance-specific content is transmitted based on the identified match.

Embodiments of the present invention may further include non-transitory computer-readable storage media, having embodied thereon a program executable by a processor to perform methods for transmitting appliance-specific content to a user device associated with an appliance as described herein.

DETAILED DESCRIPTION

Methods and systems are presented for coordinating appliance ownership data from a user device (e.g., mobile phone) with third party appliance service provider data to connect the user and a third party based on the particular appliance (e.g., make and model number). In some embodiments, third party appliance service providers (e.g., manufacturers, distributors, and/or servicers) may connect to an identified appliance and upload appliance data directly into the appliance. User settings, including appliance center settings, inputted at the user device may be pushed to the third party platform and stored in the third party platform database. As permitted by the appliance center settings, user data, including identification of appliances owned or used by a user of the user device, is sent by the user device to the third party platform, where it is matched to appliance service providers who may have information regarding the model to transmit. The third party platform may transmit the appliance-specific content to the user device in accordance with the user settings. In some embodiments, a user may customize what appliance ownership data is provided to the third party appliance service providers over the third party platform.

Figure 1:
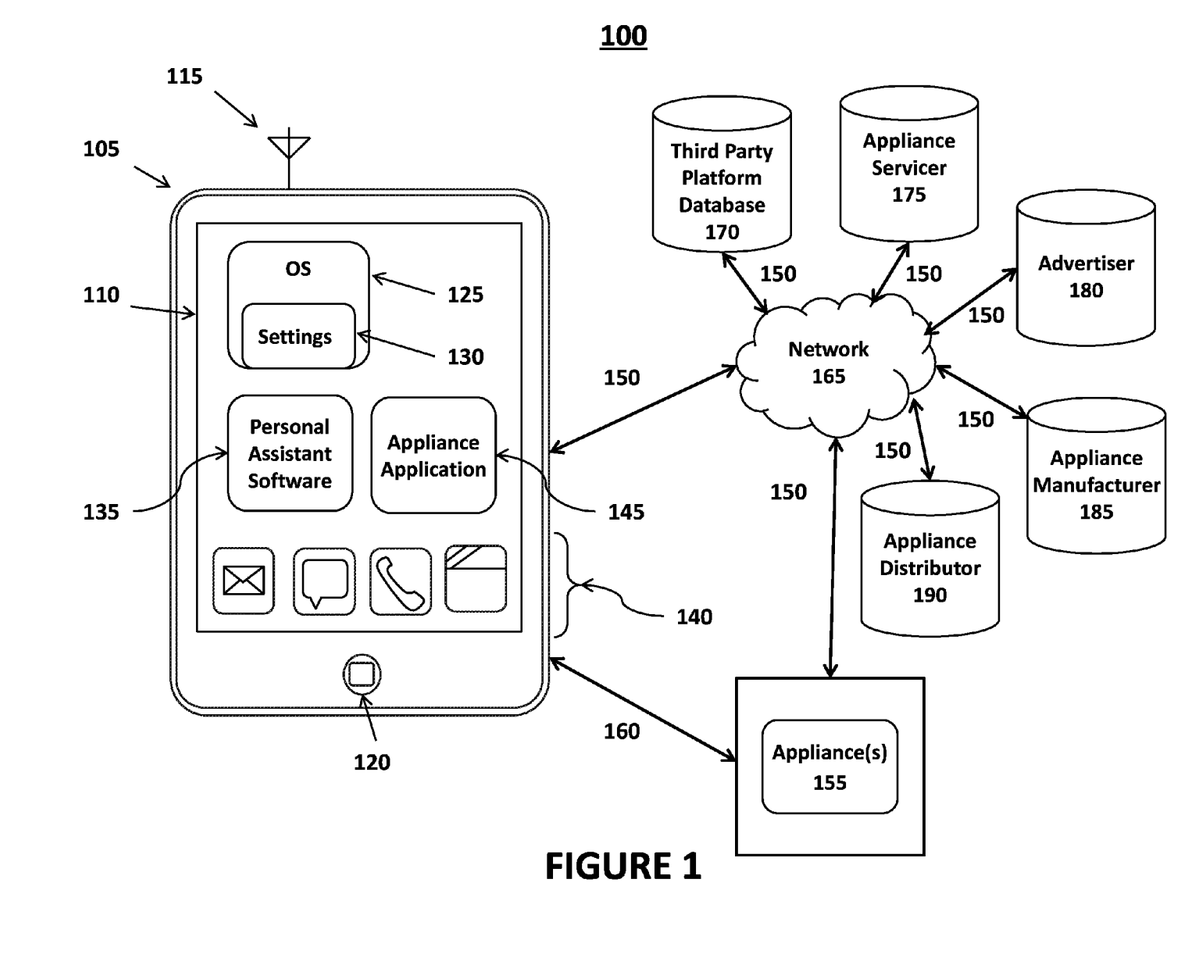
FIG. 1 illustrates an exemplary network environment in which a system for transmitting appliance-specific content to a user device associated with an appliance may be implemented.

FIG. 1 illustrates an exemplary network environment 100 in which a system for displaying next application suggestions on a user device may be implemented. Network environment 100 may include user device 105, network 165, network connections 150, appliances 155, appliance servicer 175, advertiser 180, appliance manufacturer 185, and appliance distributor 190. Any combination of the components illustrated in network environment 100, including user device 105, network 165, network connections 150, appliances 155, appliance servicer 175, advertiser 180, appliance manufacturer 185, and appliance distributor 190, and modules, processes, or subsystems of each, and any other hardware, software, or both, for implementing the features described in the present disclosure may be collectively referred to, herein, as "the system."

User device 105 may be any number of different electronic user devices 105, such as general purpose computers, mobile phones, smartphones, personal digital assistants (PDAs), portable computing devices (e.g., laptop, netbook, tablet), desktop computing devices, handheld computing device, or any other type of computing device capable of communicating over network 165. User devices 105 may also be configured to access data from other storage media, such as memory cards or disk drives as may be appropriate in the case of downloaded services. User device 105 may include standard hardware computing components, including, for example, network and media interfaces, non-transitory computer-readable storage (memory), and processors for executing instructions that may be stored in memory.

In the illustrated embodiment, user device 105 (e.g., mobile phone) includes display 110. In some implementations, display 110 may be a touchscreen display. In some implementations, display 110 is a user interface. As shown in the illustrated embodiment, display 110 may display icons corresponding to applications 140. Display 110 may include any suitable soft keys. It will be understood that user device 105 may include other elements not shown, for example, a microphone, camera, speaker, or any other suitable hardware or software elements.

User device 105 may include an operating system 125. Operating system 125 may be software that manages the use of hardware, computer programs, and applications of user device 105. Operating system 125 may be, for example, Windows, iOS, OS X, Android, UNIX, or Linux. User device 105 may additionally include settings 130, which may include configurable components of operating system 125. Settings 130 may be modifiable by a user of the user device to alter the performance of operating system 125 and other software on user device 105. In some embodiments, settings 130 may be an application on the user device 105, by which a user may select options and preferences and configures operating system functions. In an example, operating system 125 of user device 105 (e.g., an Apple device) may be iOS, and the settings 130 of user device 105 may be iOS settings. In another example, operating system 125 may be LINUX, and the settings 130 may be LINUX configuration files. In some embodiments, settings 130 may include personal assistant settings, which are modifiable by a user to alter the performance of personal assistant software 135. In some embodiments, settings 130 may be modifiable by a user to configure access to and/or sharing of application ownership data with third party platform database 170. Settings 130 are described in detail in connection with FIG. 2.

User device 105 may include any suitable software or applications. In some embodiments, personal assistant software 135 runs on user device 105. The personal assistant may be software capable of performing tasks for a user based on, for example, user input, location awareness (e.g., using a global positioning system), user settings 130, locally stored information and information accessible over a network (e.g., network 165) from a personal assistant server (not shown), third party platform database 170, applications 155, and third party appliance service providers, including, for example, appliance servicer 175, advertiser 180, appliance manufacturer 185, and appliance distributor 190. Existing, exemplary, personal assistants include, for example, SIRI™ services (for Apple devices), GOOGLE NOW™ services (for Google Android devices), S VOICE™ (for Samsung devices), and VOICE MATE™ services, (for LG Electronics devices). It will be understood that the examples of existing intelligent personal assistants described herein are merely exemplary, and the system of the present disclosure may be implemented using any suitable hardware and/or software.

In some embodiments, personal assistant software 135 is a personal assistant application running on user device 105. Personal assistant software 135 may, for example, send messages, make telephone calls, set reminders, make calendar appointments, retrieve data locally or remotely, perform internet searches, generate audio or visual output at a speaker or interface of the user device, or perform any other suitable actions in response to user input. In some embodiments, depressing electromechanical button 120 may activate the personal assistant. In some embodiments, actuating a personal assistant soft key may turn the personal assistant ON or OFF.

Applications 140 are software modules on user device 105, which may be downloaded from remote servers. Applications 140 may provide additional functions for user device 105. For example, applications 140 may be any suitable applications downloaded from, for example, Apple Inc.'s APP STORE® (for Apple devices), GOOGLE PLAY® (for Google Android devices), or any other suitable database or server. In some embodiments, applications 140 may be software, firmware, or hardware that is integrated into the user device 105.

Appliances 155 may be any suitable device or piece of equipment designed for performance of a particular task. For example, appliances 155 may include a refrigerator, oven, clothes dryer, toaster, or any other suitable for device or piece of equipment for performing a task. Appliances 155 may be connected to network 165 over network communications 150 and to user device 105 over network connection 160. It will be understood that the described appliances are merely exemplary and that "appliance" may refer to any other suitable device or equipment. It will also be understood that appliances 155 may be any suitable number of appliances owned, operated by, or registered to the user or an agent of the user. In some embodiments, user device 105 is associated with appliances 155. In some embodiments, appliances 155 may include one or more Wi-Fi-enabled appliances, which user device 105 may connect to over network connection 160. As described in detail in connection with FIG. 2, a user may specify certain appliances 155 to be coupled to network 165. In some embodiments, also as described in connection with FIG. 2, a user may input appliance ownership data associated with a selection of some or all of appliances 155, the appliance ownership data indicating that user device 105 is associated with the selected appliances 155. Appliance ownership data may include a make and model number associated with each of the selected appliances 155 or any other suitable identifier, which may be assigned by and recognizable to a third party appliance service provider 175-190.

Appliance application 145 may be a software module running on user device 105, which may be downloaded from a remote server. Appliance application 145 may provide an interface for display of user settings 130 to a user of user device 105. In particular, a user may use appliance application 145 to set and view appliance center settings (described below in connection with FIG. 2), which may be used to provide appliance ownership data to third party platform database 170 and various third party appliance service providers 175-190 (e.g., appliance servicer 175, advertiser 180, appliance manufacturer 185, and appliance distributor 190) over third party platform database 170.

Antenna 125 is a component of user device 105. In some embodiments, user device 105 may use antenna 125 to send and receive information wirelessly. For example, antenna 125 may be a cellular data antenna, Wi-Fi antenna, or BLUETOOTH® antenna.

Network connections 150 may include any suitable wired or wireless transmission mediums or channels through which data may be communicated between user device 105, network 165, third party platform database 170, and third party appliance service providers 175-190 (e.g., appliance servicer 175, advertiser 180, appliance manufacturer 185, and appliance distributor 190). Network connections may include, for example, a computer networking cable, an Ethernet cable, a cellular communications network, an Internet data trunk (e.g., single transmission channel), a wireless local area network, a wide area network, or a telecommunications network (e.g., 4G wireless network).

Network 165 may include the Internet, a system of interconnected computer networks that use a standard protocol, a dispersed network of computers and servers, a local network, a public or private intranet, any other coupled computing systems, or any combination thereof. In some embodiments, network 165 may be a cloud, which is a network of remote servers hosted on the Internet and used to store, manage, and process data in place of local servers or personal computers. User device 105 may be coupled to network 165 though any suitable wired or wireless connection. In some embodiments, user device 105 may be coupled to network 165 via network connection 150.

Network 165 may allow for communication between the user device 105, third party platform database 170 and third party appliance service provider 175, and personal assistant server 180 via various communication paths or channels. Such paths or channels may include any type of data communication link known in the art, including TCP/IP connections and Internet connections via Wi-Fi, BLUETOOTH, a Universal Mobile Telecommunications System (UMTS) network, or any other suitable data communication link. In that regard, network 165 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Network 165 allows for communication between any of the various components of network environment 100.

Third party platform database 170 may provide a communications interface between third party appliance service providers 175-190 (e.g., appliance servicer 175, advertiser 180, appliance manufacturer 185, and appliance distributor 190) and user device 105. In some embodiments, third party platform database 170 provides a secure connection based on a third party user ID received from user device 105. Third party platform database 170 may be coupled to network 165 by network connection 150, and further coupled to user device 105 by network connection 150 and to third party appliance service provider 175 by network connection 150. Third party platform database 170 is accessible by other devices through network 165. In some embodiments, user device 105 may transmit user settings (e.g., settings 130) over network 165 to third party platform database 170. The user settings may dictate which third parties may share appliance-specific content with user device 105, what appliance ownership data (e.g., regarding appliances 155) is stored in third party platform database 170, and what third party content may be communicated to user device 105. Third party appliance service providers (e.g., appliance servicer 175, advertiser 180, appliance manufacturer 185, and appliance distributor 190) may be matched with user device 105 based on user settings and an appliance match between user device 105 and the third party appliance service provider. In some embodiments, matched third parties may transmit appliance-specific content to user device 105 based on user settings 130.

Third party platform database 170 may be coupled to any suitable third party appliance service providers, including, for example, appliance servicer 175, advertiser 180, appliance manufacturer 185, and appliance distributor 190. It will be understood that the shown embodiment is provided by way of illustration and not by way of limitation. Any suitable additional or different third party appliance service providers may be used. Additionally, each type of third party appliance service provider (e.g., appliance server 175 or appliance manufacturer 185) may be more than one third party appliance service provider of that type. For example, in the illustrated embodiment, appliance distributor 190 is shown, but it will be understood that any number of appliance distributors may be used (e.g., Home Depot, Best Buy, and Sears may all be coupled to network 165 over network connections 150).

Third party platform database 170 and third party appliance service providers, including, appliance servicer 175, advertiser 180, appliance manufacturer 185, and appliance distributor 190 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

Figure 2:
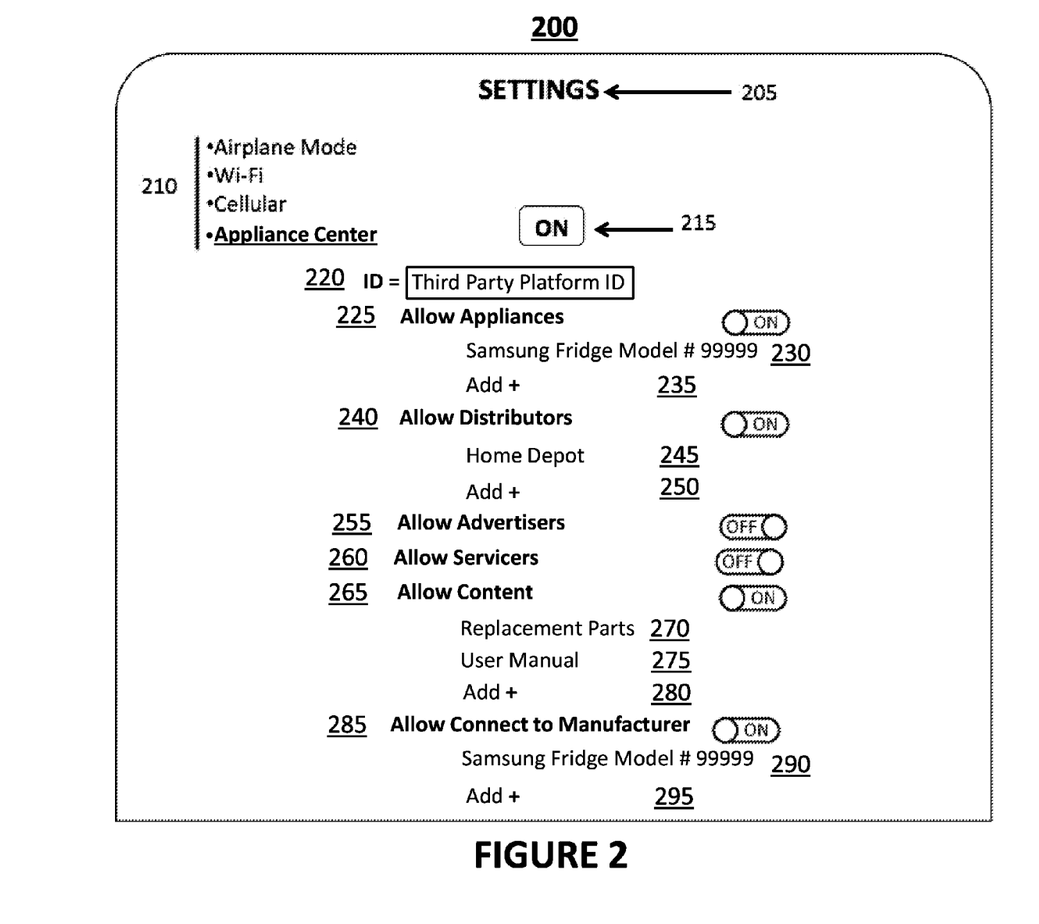
FIG. 2 is a diagram illustrating exemplary settings of an operating system on a user device that may be used with a system for transmitting appliance-specific content to a user device associated with an appliance.

FIG. 2 is a diagram illustrating exemplary settings 200 of an operating system on a user device that may be used with a system for transmitting appliance-specific content to a user device associated with the appliance. In some embodiments, settings 200 may be displayed on a display screen of user device 105 of FIG. 1. Settings 200 may, for example, provide a mechanism by which a user may alter the functions of an operating system of a user device by implementing changes to settings. User interface 200 may facilitate user interaction with a user device.

User interface 200 may include settings menu 205. Settings menu 205 may include user-editable features for customizing the functionality of an operating system or user device according to user preferences. In some implementations, settings of operating system 125 of user device 105 of FIG. 1 may be modified by the user interacting with options or commands in a respective settings menu 205. Settings menu 205 may include any number of user-selectable options or commands. Settings menu 205 may include any suitable number of standard operating system or user device settings, for example, standard settings 210, including airplane mode, Wi-Fi, and cellular, as shown in FIG. 2. Standard settings 210 are exemplary interface elements that, when selected by a user, may, for example, redirect the user to a respective new page, window, or dialogue box.

In some embodiments, settings menu 205 includes a list of user-selectable options or settings presented in a hierarchical order. For example, appliance center settings 215 may be sub-settings under standard settings 210. Standard settings 210 may include appliance center settings 215, which are shown as selected (e.g., underlined) in FIG. 2, and the selection of appliance center settings 215 may appliance settings 220-295. Appliance center settings 215 include exemplary settings categories that, when selected by a user, may, for example, redirect the user to a respective new page, window, or dialogue box. In another example, when selected, any of the interface elements may expand to reveal sub-options, sub-commands, or any other suitable settings display elements.

In some embodiments, the appliance center settings 215 may include user-editable features for customizing the functionality of an appliance application running on a user device. In some embodiments, appliance center settings 215 may be used to customize the functionality of appliance application 145 of FIG. 1. As illustrated in FIG. 2, appliance center settings 215 may include a mechanism for selection and de-selection of appliance settings. In the shown embodiment, on/off selection buttons are illustrative examples of mechanisms for selection and de-selection of appliance settings. In some embodiments, selection and de-selection in settings menu 205 are binary selections.

In some embodiments, appliance center settings 215 includes a sub-menu of appliance settings 220-295, which are user-selectable options or commands for determining the functionality of an appliance applications running on the user device. The appliance center settings 215 may include any suitable number of selectable appliance settings 220-295, which may correspond to exemplary data and data sources (e.g., third party appliance service providers) to be used in providing appliance center features, as shown in FIG. 2. In the illustrated embodiment, appliance center settings 215 is selected to be "ON," indicating the feature is activated.

In the illustrated embodiment, exemplary appliance settings 220-295 are shown. Third party platform ID 220 allows a user to input a user ID relative to third party platform access. Third party platform ID 220 may allow a user to login to/be authenticated to the third party platform. Coupled with a user ID (e.g., user device ID), third party platform ID 220 may facilitate secure data transfers between authenticated parties. In some embodiments, third party appliance service providers may also be associated with respective third party platform IDs, which the third party platform may require for authentication.

Using appliance settings, a user may allow or disallow third party appliance service provider interaction and access to user data, including appliance ownership data. For example, a user may permit or deny appliance searches (e.g., search for users who own a particular appliance) from appliance distributors, manufacturers, servicers, and advertisers. Using allow distributors 240, a user may allow or disallow appliance searches and appliance data transmissions from appliance distributors. An appliance distributor, as used herein, may include any party that participates in the representation of the manufacturer, and/or sale or distribution of the appliance. In the illustrated embodiment, allow distributors 240 is shown as "ON." Exemplary appliance distributor 245 is shown (e.g., Home Depot). In some embodiments, appliance distributor 245 may correspond to appliance distributor 190 of FIG. 1. Add 245 may be used to add additional or different third party distributors to the list of allowed distributors.

Using allow advertisements 255, a user may allow or disallow appliance searches and/or advertisements from third party advertisers. For example, an advertiser may discover via an appliance search that a user owns a particular product and thus generate and transmit certain advertisements for related products to the user. In the illustrated embodiment, allow advertisements 255 is shown to be "OFF."

Using allow servicers 260, a user may allow or disallow appliance searches and appliance data transmissions from appliance servicers. An appliance servicer, as used herein, may include any party that services or repairs an appliance. In the illustrated embodiment, allow servicers 260 is shown as "OFF." An add tool (not shown) may be used to add additional or different third party appliance servicers to the list of allowed servicers.

The appliance settings may also be used to dictate which appliances may be discoverable via an appliance search of a third party appliance service provider. Using allow appliances 225, a user may select appliances about which appliance ownership data is sent to the third party platform and stored in the third party platform database (e.g., third party platform database 170 of FIG. 1). In the illustrated embodiment, exemplary appliance 230 is shown (e.g., Samsung Fridge Model #99999). Add 235 may be used to add additional or different appliances of the user to the list of appliances approved for use with the appliance center features.

The appliance settings may also be used to dictate what types of appliance information may be received from third party appliance service providers. Using allow content 265, a user may allow or disallow the receipt of different types of content transmitted by third party appliance service providers. Exemplary content 270-275 are shown (e.g., replacement parts 270, user manual 275). It will be understood that appliance content 270-275 are merely exemplary and that any suitable types of content may be used. Add 280 may be used to add additional or different content to the list of allowed content (e.g., a parts list or warranty information).

Allow connect to manufacturer 285 may be used to allow or disallow automatic connection of a manufacturer to an appliance over a network (e.g., an appliance with internet connectivity). In the illustrated embodiment, allow connect to manufacturer 285 is shown to be "ON." In some embodiments, once connected, a manufacturer may push updates or information to the connected appliance. For example, a manufacturer of a internet-enabled clothes washing machine may connect to the appliance and transmit a user manual that is automatically downloaded by the washing machine upon receipt due to the established connection. In the illustrated embodiment, exemplary appliance 290 is shown (e.g., Samsung Fridge Model #99999). In some embodiments, exemplary appliance 290 may correspond to appliance(s) 155 of FIG. 1. Add 295 may be used to add additional or different appliances of the user to the list of appliances that are permitted to connect to the manufacturer.

Figure 3:
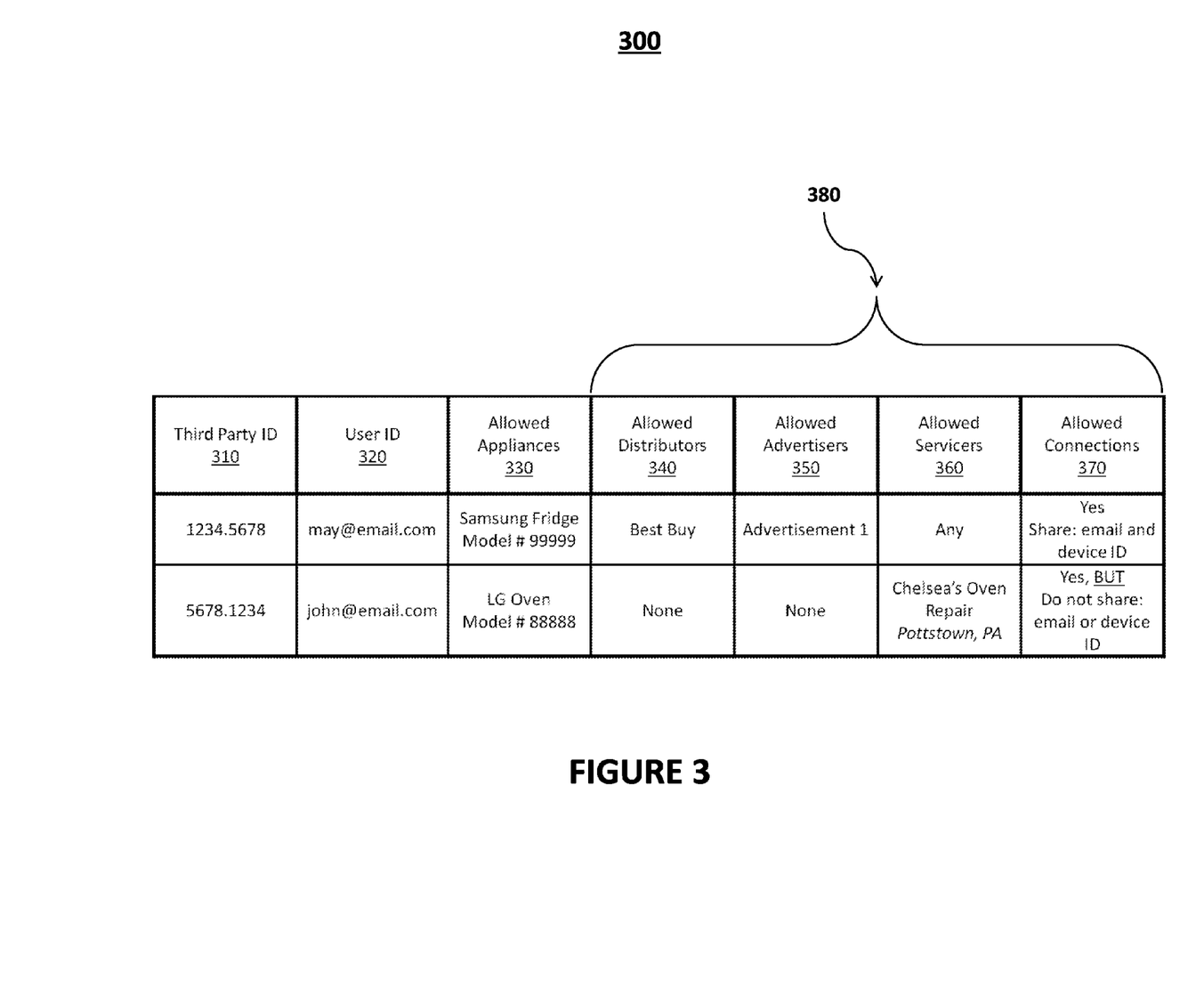
FIG. 3 illustrates an exemplary database of a third party platform database that may be used with a system for transmitting appliance-specific content to a user device associated with an appliance.

FIG. 3 illustrates an exemplary third party platform database 300 that may be used with a system for transmitting appliance-specific content to a user device associated with an appliance. In some embodiments, third party platform database 300 may correspond to third party platform database 170 of FIG. 1. In some embodiments, third party platform database 300 may be implemented as part of a third party platform, which may correspond to third party platform 505 of FIG. 5, described herein. In some embodiments, third party platform database 300 serves as a standardized interface. In the illustrated embodiment, third party database 300 includes rows 1-2, which are illustrative appliance center settings retrieved from a user device. It will be understood that the data shown in third party platform database 300 is merely exemplary and not presented by way of limitation.

In some embodiments, third party platform database 300 includes user settings retrieved from a user device (e.g., user device 105 of FIG. 1) and third party appliance service provider data (e.g., third party appliance service providers 175-190 of FIG. 1). In some embodiments, the retrieved user settings may correspond to appliance center settings 215 of settings menu 205 of FIG. 2. In the illustrated embodiment, third party platform database 300 shows user settings as columns of data, including, third party ID 310, user ID 320, allowed appliances 330, allowed distributors 340, allowed advertisements 350, allowed servicers 360, and allowed connection 370.

Third party platform ID 310 and user ID 320 may be used to provide a secure data exchange and to safeguard user privacy. In some embodiments, third party platform ID 310 may be any unique identification code, username, password, or other suitable unique identification that uniquely identifies the user device providing data to third party platform database 300. The third party platform ID 310 may be used to authenticate the user device. In some embodiments, third party appliance service providers (e.g., third party appliance service providers 175-190 of FIG. 1) may retrieve data from and transmit data to the authenticated user device via the third party platform. The third party appliance service providers do not have access to a user's third party platform ID 310, as it is used for privacy/authentication purposes only at the third party platform. In the illustrated embodiment, row 1 shows an exemplary third party platform ID 310 as [1234.5678], and row 2 shows an exemplary third party platform ID 310 as [5678.1234]. It will be understood that third party platform ID 310 may be of any form defined by the third party platform. In some embodiments, third party platform ID 310 may correspond to third party platform ID 220 of FIG. 2. User ID 320 may include any user identification to be shared with third party appliance service providers. In the illustrated embodiment, user ID 320 is an email address, shown in row 1 as [may@email.com] and shown in row 2 as john@email.com.

Third party platform database 300 may also include one or more user-selected, allowed appliances 330. In some embodiments, a user may specify in appliance settings (e.g., allow appliances 225 of FIG. 2), which appliances are to be included in allowed appliances 330. In some embodiments, allowed appliances 330 may include appliance ownership data provided by the user, including, for example, the allowed appliance type, and the make, model, and/or other identifying information associated with the appliance. In the illustrated embodiment, row 1 shows an exemplary allowed appliance 330 as [Samsung Fridge Model #99999], and row 2 shows an exemplary allowed appliance 330 as [LG Oven Model #88888].

Third party platform database 300 may also include categories of allowed third party appliance service providers 380. The one or more approved third party appliance service providers may be approved by the user in user settings (e.g., appliance settings 215 of FIG. 2). It will be understood that a user may specify, broadly, a company name, or, specifically, a store location as an approved third party appliance service provider. In the illustrated embodiment, allowed third party appliance service providers 380 includes allowed distributors 340. In some embodiments, a user may specify in appliance settings (e.g., allow distributors 240 of FIG. 2), which appliance distributors are to be included in allowed distributors 340. In the illustrated embodiment, row 1 shows an exemplary allowed appliance distributor 340 as [Best Buy], and row 2 shows the user has not selected any allowed distributors 340 (e.g., "none" are approved).

In the illustrated embodiment, allowed third party appliance service providers 380 includes allowed advertisers 350. In some embodiments, a user may specify in appliance settings (e.g., allow advertisers 255 of FIG. 2), which advertisers or advertisements are to be included in allowed advertisers 350. In the illustrated embodiment, row 1 shows an exemplary allowed advertiser 350 as [Advertiser 1], which may correspond to any suitable advertiser selected by the user, and row 2 shows the user has not selected any allowed advertisers 340 (e.g., "none" are approved).

In the illustrated embodiment, allowed third party appliance service providers 380 includes allowed servicers 360. In some embodiments, a user may specify in appliance settings (e.g., allow servicers 260 of FIG. 2), which appliance servicers are to be included in allowed servicers 360. In the illustrated embodiment, row 1 shows an exemplary allowed appliance servicer 360 as [Any], and row 2 shows an exemplary allowed appliance servicer 360 as [Chelsea's Oven Repair in Pottstown, Pennsylvania].

In the illustrated embodiment, allowed third party appliance service providers 380 includes allowed connections 370. In some embodiments, a user may specify in appliance settings (e.g., allow connect to manufacturer 285 of FIG. 2), whether appliances may be linked to manufacturers so that a manufacturer may provide automatic updates or downloads of appliance-specific content directly to the linked appliance. In the illustrated embodiment, row 1 shows an exemplary allowed connection 370 as [Yes] with the limitation [Share: email and device ID (e.g., user ID 320), and row 2 shows an exemplary allowed connection 370 as [Yes] with the limitation [Do not share: email or device ID (e.g., user ID 320)).

It will be understood that the illustrated third party platform database 300 is provided by way of example and not by way of limitation. Any other suitable appliance ownership data and appliance settings may be received from a user device and stored in third party platform database 300.

Figure 4:
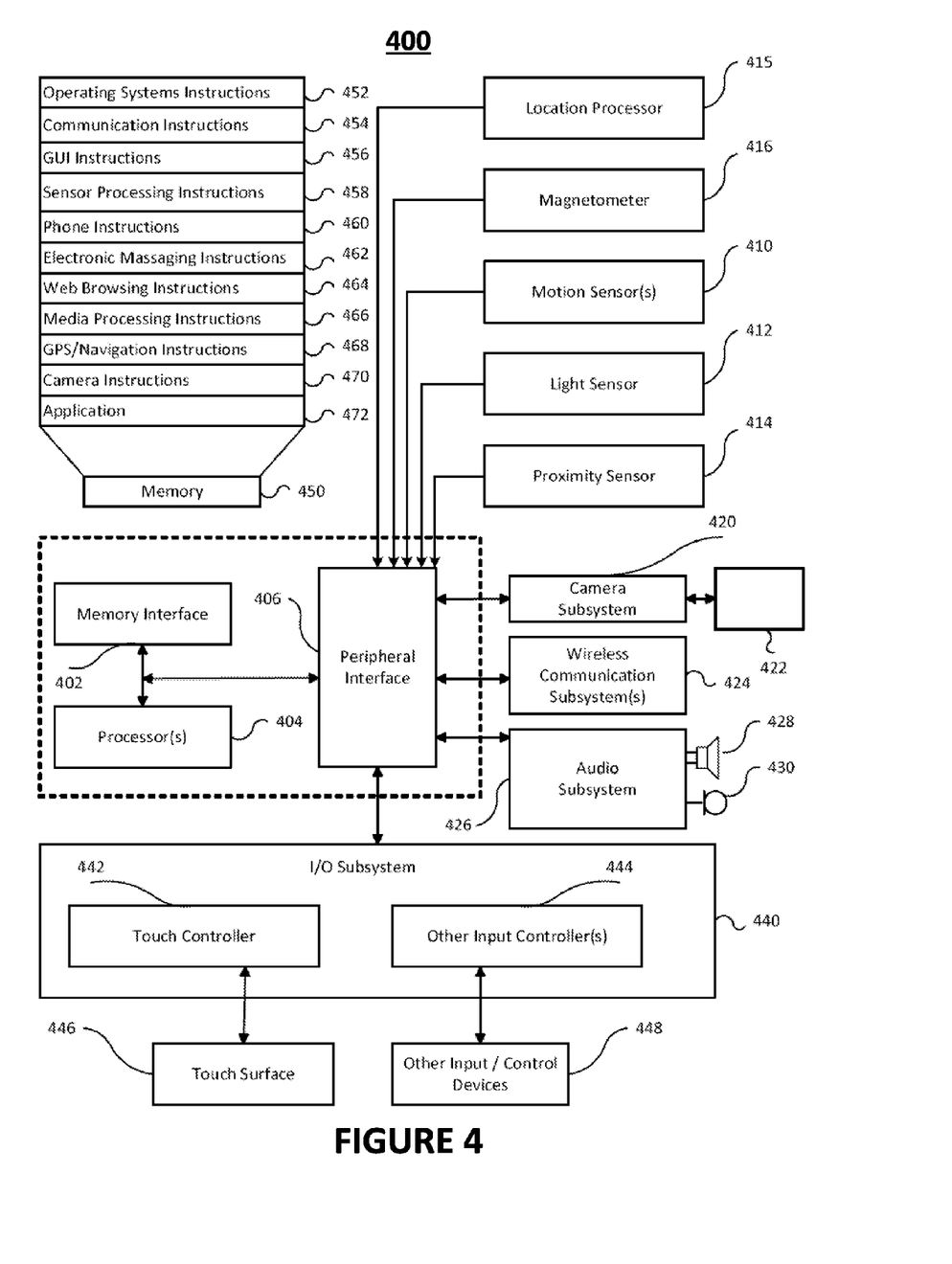
FIG. 4 illustrates an exemplary device architecture of a user device that may be used with a system for transmitting appliance-specific content to a user device associated with an appliance.

FIG. 4 illustrates a mobile device architecture that may be utilized to implement the various features and processes described herein. Architecture 400 can be implemented in any number of portable devices including but not limited to smart phones, electronic tablets, and gaming devices. Architecture 400 as illustrated in FIG. 4 includes memory interface 402, processors 404, and peripheral interface 406. Memory interface 402, processors 404 and peripherals interface 406 can be separate components or can be integrated as a part of one or more integrated circuits. The various components can be coupled by one or more communication buses or signal lines.

Processors 404 as illustrated in FIG. 4 is meant to be inclusive of data processors, image processors, central processing unit, or any variety of multi-core processing devices. Any variety of sensors, external devices, and external subsystems can be coupled to peripherals interface 406 to facilitate any number of functionalities within the architecture 400 of the exemplar mobile device. For example, motion sensor 410, light sensor 412, and proximity sensor 414 can be coupled to peripherals interface 406 to facilitate orientation, lighting, and proximity functions of the mobile device. For example, light sensor 412 could be utilized to facilitate adjusting the brightness of touch surface 446. Motion sensor 410, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 406, such as a temperature sensor, a biometric sensor, or other sensing device to facilitate corresponding functionalities. Location processor 415 (e.g., a global positioning transceiver) can be coupled to peripherals interface 406 to allow for generation of geolocation data thereby facilitating geo-positioning. An electronic magnetometer 416 such as an integrated circuit chip could in turn be connected to peripherals interface 406 to provide data related to the direction of true magnetic North whereby the mobile device could enjoy compass or directional functionality. Camera subsystem 420 and an optical sensor 422 such as a charged coupled device (CCD) or a complementary metal-oxide semiconductor (CMOS) optical sensor can facilitate camera functions such as recording photographs and video clips.

Communication functionality can be facilitated through one or more communication subsystems 424, which may include one or more wireless communication subsystems. Wireless communication subsystems 424 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 424 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 424 may include hosting protocols such that the device may be configured as a base station for other wireless devices. Communication subsystems can also allow the device to synchronize with a host device using one or more protocols such as TCP/IP, HTTP, or UDP.

Audio subsystem 426 can be coupled to a speaker 428 and one or more microphones 430 to facilitate voice-enabled functions. These functions might include voice recognition, voice replication, or digital recording. Audio subsystem 426 in conjunction may also encompass traditional telephony functions.

I/O subsystem 440 may include touch controller 442 and/or other input controller(s) 444. Touch controller 42 can be coupled to a touch surface 446. Touch surface 446 and touch controller 442 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 446 may likewise be utilized. In one implementation, touch surface 446 can display virtual or soft buttons and a virtual keyboard, which can be used as an input/output device by the user.

Other input controllers 444 can be coupled to other input/control devices 448 such as one or more buttons, rocker switches, thumb-wheels, infrared ports, USB ports, and/or a pointer device such as a stylus. The one or more buttons (not shown) can include an up/down button for volume control of speaker 428 and/or microphone 430. In some implementations, device 400 can include the functionality of an audio and/or video playback or recording device and may include a pin connector for tethering to other devices.

Memory interface 402 can be coupled to memory 450. Memory 450 can include high-speed random access memory or non-volatile memory such as magnetic disk storage devices, optical storage devices, or flash memory. Memory 450 can store operating system 452, such as Darwin, RTXC, LINUX, UNIX, OS X, ANDROID, WINDOWS, or an embedded operating system such as VxWorks. Operating system 452 may include instructions for handling basic system services and for performing hardware dependent tasks. In some implementations, operating system 452 can include a kernel.

Memory 450 may also store communication instructions 454 to facilitate communicating with other mobile computing devices or servers. Communication instructions 454 can also be used to select an operational mode or communication medium for use by the device based on a geographic location, which could be obtained by the GPS/Navigation instructions 468. Memory 450 may include graphical user interface instructions 456 to facilitate graphic user interface processing such as the generation of an interface; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes, camera instructions 470 to facilitate camera-related processes and functions; and instructions 472 for any other application that may be operating on or in conjunction with the mobile computing device. Memory 450 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 450 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

Figure 5:
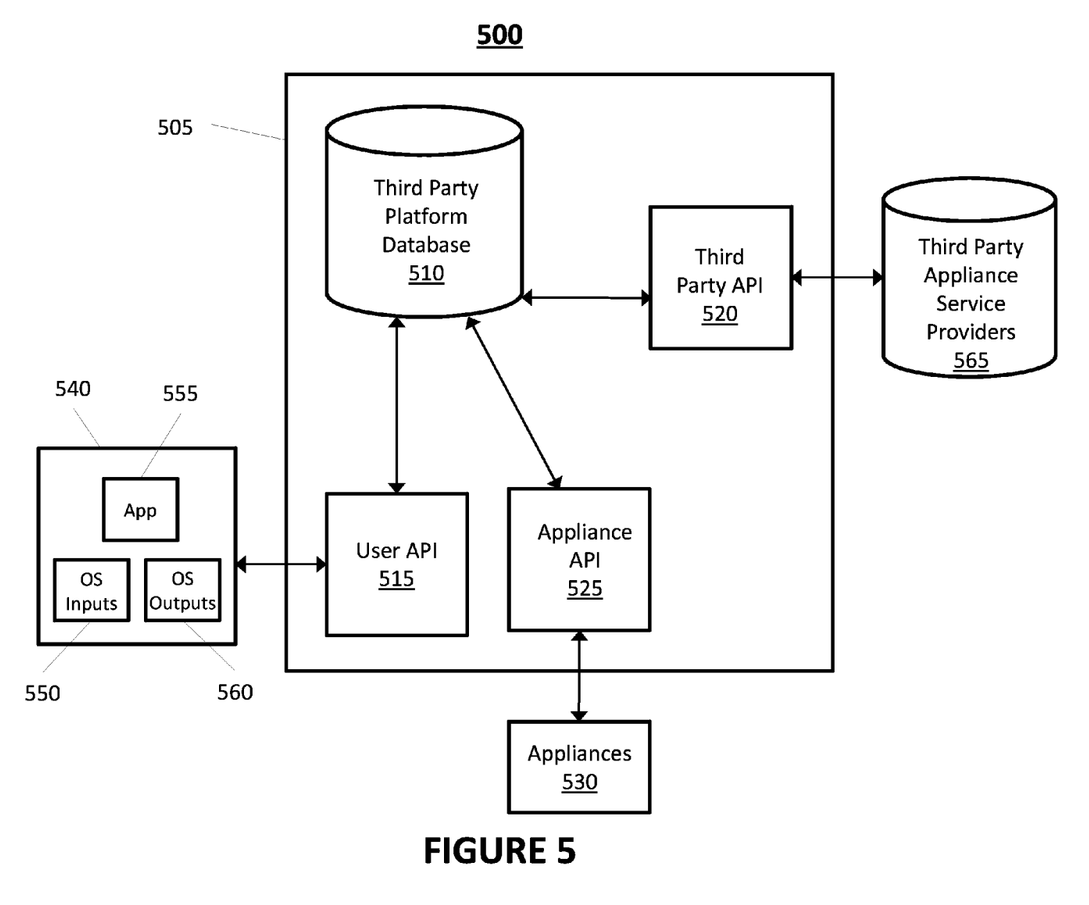
FIG. 5 illustrates an exemplary third party platform in which a system for transmitting appliance-specific content to a user device associated with an appliance may be implemented.

FIG. 5 illustrates an exemplary third party platform system 500 for transmitting appliance-specific content to a user device associated with an appliance may be implemented. System 500 includes third party platform 505, which, in turn, includes third party platform database 510. In some embodiments, third party platform database 510 may correspond to third party platform database 170 of FIG. 1 and/or third party platform database 300 of FIG. 3. Third party platform 505 may include user API 515, appliance API 525, and third party API 520, each of which is coupled to third party platform database 510. In some embodiments, third party API 520 may be a third party service user interface.

In some embodiments, interface 520 may be an Application Programming Interface (API) into which third party appliance service providers 565 may input appliance searches and appliance-specific content. An appliance search may be, for example, a request for all user devices associated with a particular appliance make and model number. Third party platform 505 may determine one or more user devices that match the application search based on the application ownership data stored for a plurality of users and user devices in third party platform database 510. As shown, third party API 520 may be coupled to third party appliance service providers 565 over a network for example, network 165 of FIG. 1. In some embodiments, third party appliance service providers 565 may correspond to third party appliance service providers 175-190 of FIG. 1. For example, third party appliance service providers 565 may include any number of appliance servicer 175, advertiser 180, appliance manufacturer 185, and appliance distributor 190. In some embodiments, third party appliance service providers 565 may be approved third party appliance service providers based on appliance center settings set by the user at the user device (e.g., appliance settings 215 of FIG. 2).

In some embodiments, user API 515 may be an API into which user device 540 may load appliance ownership data and appliance center settings. User API 515 may, in turn, load the data to third party platform database 510. As illustrated, user API 515 is connected to user device 540 over a network, for example, network 165 of FIG. 1.

In some embodiments, appliance API 525 may be an API that receives appliance-related information from appliances 530. In some embodiments, appliances 530 correspond to appliances 155 as described above in connection with FIG. 1

User device 540 also includes app 555, which may be an appliance application. In some embodiments, an appliance center feature of user device 540 may be implemented on appliance application 555. For example, activating an appliance center feature may be implemented by executing an appliance center application. In some embodiments, the appliance center feature of user device 540 may be implemented on more than one appliance application 555 or other existing applications. In some embodiments, appliance center application 555 may include an interface and display appliance center settings, for example appliance center settings 215 of FIG. 2. In some embodiments, an interface of appliance application 555 may display any information stored in third party platform database 510 In some embodiments, appliance application 555 may correspond to appliance application 145 of FIG. 1. In some embodiments, third party platform 505 may load appliance-specific content into itinerary application 555 when, for example, appliance center setting 215 of FIG. 2 is switched "ON."

User device 540 also includes OS inputs 550 and OS Outputs 560. In some embodiments, OS input 550 may include operating system input types that a user has specified in settings as editable or non-editable (e.g., "yes" or "no") by a third party appliance service provider via the third party platform. In the illustrated embodiment, OS input 560 includes calendar input (e.g., an entry in a calendar application) and personal assistant input (e.g., instructing personal assistant to relay information to the user). In some embodiments, the types of OS input 560 may be selected and allowed or disallowed by the user in user settings (e.g., appliance center settings 215 of FIG. 2). In some embodiments, appliance-specific content may be sent from a third party appliance service provider to the third party platform. The third party platform may send the appliance-specific content (e.g., appliance data) to the user device, where it is provided to the user based on the allowed OS input types. For example, an appliance manufacturer may provide an updated user manual to a connected appliance via the third party platform, and the third party platform may also provide a notification of the appliance update via a personal assistant application running on user device 540. The personal assistant application, for example, personal assistant software 135 of FIG. 1, may provide the appliance update information to the user (e.g., by audio output of a speaker of user device 540).

In some embodiments, OS output 560 may include operating system output types that a user has specified in settings as accessible or not accessible (e.g., "yes" or "no") by a third party appliance service provider via the third party platform. In some embodiments, OS output 560 may include geolocation, which may correspond to a GPS location transmitted by the user device. In some embodiments, the types of OS output 560 may be selected and allowed or disallowed by the user in user settings (e.g., appliance center settings 215 of FIG. 2).

For example, OS outputs 560 may include geolocation data, which may be sent to third party platform 505 over a network and accessed by the third party appliance service providers 565 to determine appropriate appliance-specific content to be sent to user device 540, which is associated with an appliance.

Figure 6:
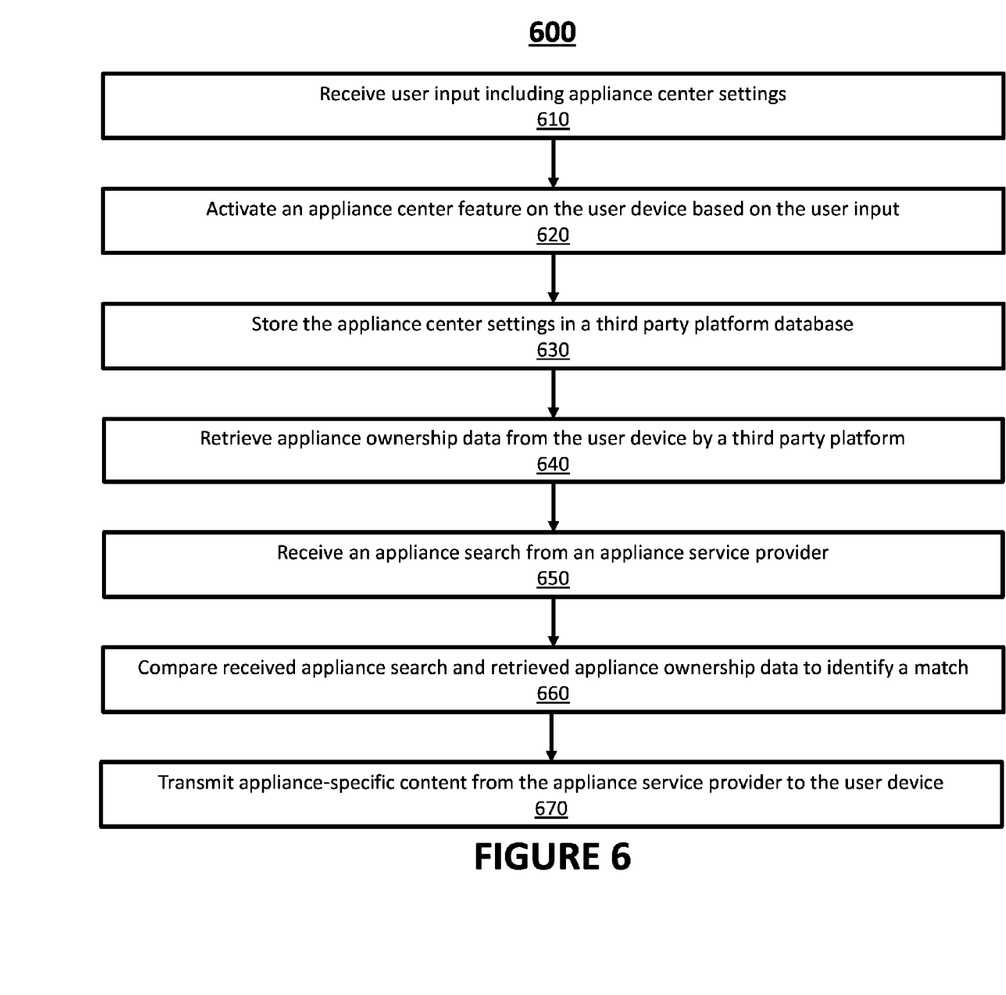
FIG. 6 is a flowchart illustrating an exemplary method for transmitting appliance-specific content to a user device associated with an appliance.

FIG. 6 is a flowchart illustrating an exemplary method for transmitting appliance-specific content to a user device associated with an appliance. In some embodiments, the user device may correspond to user device 540 of FIG. 5.

At step 610, the system receives user input including appliance center settings. In some embodiments, appliance center settings may correspond to appliance center settings 215 of FIG. 2.

At step 620, the system activates an appliance center feature on the user device based on the user input received at step 610. In some embodiments, activating an appliance center feature may include executing an appliance center application on the user device, for example, appliance application 555 of FIG. 5.

At step 630, the system stores the appliance center settings in a third party platform database. In some embodiments, the system stores the appliance center settings on a database of a third party platform, and the appliance center settings are sent over a network from the user device. In some embodiments, the third party platform database may correspond to third party platform database 510 and the third party platform may correspond to third party platform 505 of FIG. 5.

At step 640, the system retrieves appliance ownership data from the user device by a third party platform. In some embodiments, the system retrieves appliance ownership data from the user device, by the third party platform, and the appliance ownership data is retrieved based on the appliance center settings received at step 610, where the retrieved appliance ownership data is stored in, for example, third party platform database 510 of FIG. 5.

At step 650, the system receives an appliance search from an appliance service provider (e.g., third party appliance service providers 565 of FIG. 5 or third party appliance service providers 175-190 of FIG. 1), and the appliance search is retrieved based on the appliance center settings received at step 610. In some embodiments, the system may store the appliance search in a third party platform database (e.g., third party platform database 510 of FIG. 5). The appliance center settings may correspond to appliance center settings 215 of FIG. 2. In some embodiments, appliance center settings may be stored in third party platform database 300 of FIG. 3 and may include third party appliance service provider settings 380 by which the user may select which and what types of third party appliance service providers may receive appliance ownership data from the user device and transmit appliance-specific content to the user device over the third party platform.

At step 660, the system compares the received appliance search and the retrieved appliance ownership data to identify a match between an appliance associated with the user device and the appliance service provider. In some embodiments, the system may compare the appliance ownership data retrieved at step 640 and the appliance search received at step 650. In some embodiments, the system may determine there is a match based on appliance center settings received at step 610.

At step 670, the system transmits appliance-specific content to the user device, the appliance-specific content sent from the appliance service provider via the third party platform. In some embodiments, the system transmits the appliance-specific content based on the match. In some embodiments, the appliance-specific content may be sent directly to an appliance associated with the user device by a network connection linking the appliance and the third party platform. In some embodiments, the appliance-specific content may be sent automatically between a third party platform and a linked appliance.

The foregoing detailed description of the technology herein has been presented for purposes of illustration and description. It is not intended to be exhaustive or to limit the technology to the precise form disclosed. Many modifications and variations are possible in light of the above teachings. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for receiving appliance-specific content on a user device, the method comprising:

receiving a first user input via a user interface at the user device, wherein the first received user input includes a selection of an appliance center setting, the selection identifying at least one appliance manufacturer from a plurality of appliance manufacturers, the appliance center setting included in operating system software of the user device;

receiving a second user input via the user interface, wherein the second received user input includes a selection of a function of a plurality of functions corresponding to the selected appliance manufacturer, the selected function included in the operating system software of the user device;

transmitting information corresponding to the selected manufacturer and to the selected function for storage to a database of a third party platform, wherein the information corresponding to the selected manufacturer and to the selected function are transmitted over a network from the user device;

executing instructions stored in memory, wherein the execution of the instructions by the processor:

activates an appliance center feature on the user device based on the first and second user inputs, and prepares appliance ownership data for transmission from the user device regarding an appliance based on the selected manufacturer and the selected function in response to an appliance search by the third party platform, and wherein the appliance ownership data is transmitted to the third party platform for storage in the database; and receiving appliance-specific content from a requesting appliance service provider identified as an allowed appliance service provider, wherein the third party platform:

receives an appliance search request including appliance-identifying information from the requesting appliance service provider, compares the appliance search request and the transmitted appliance ownership data to identify a match to the appliance associated with the user device, and allows the appliance-specific content to be transmitted from the requesting appliance service provider based on the identified match, wherein the content is specific to the matching appliance, and corresponds to the selected manufacturer and the selected function.

2. The method of claim 1, wherein the appliance center setting identifies an allowed appliance, and wherein the appliance ownership data is transmitted only for the allowed appliance when the selected function enables the transmission based on the appliance ownership data.

3. The method of claim 1, wherein the appliance center mode is activated based on the appliance center setting.

4. The method of claim 1, wherein the user device is authenticated at the third party platform, the authentication is based on a user ID associated with a user of the user device and a third party platform ID uniquely associated with the user device, and the appliance center setting includes the user ID and the third party platform ID.

5. The method of claim 1, wherein the appliance search is allowed when a function of the plurality of functions enables the appliance search, the appliance search identifying information includes an appliance make and model number.

6. The method of claim 5, wherein comparing the received appliance search request and the transmitted appliance ownership data includes looking for the same appliance make and model number in the transmitted appliance ownership data.

7. The method of claim 6, wherein the third party platform further receives application ownership data from a plurality of user devices, and wherein information in the received appliance search request is compared to the application ownership data from the plurality of user devices.

8. The method of claim 7, wherein more than one match is identified, each identified match between a respective appliance associated with a user device and the appliance service provider.

9. The method of claim 1, wherein the appliance service provider is an appliance manufacturer, and the user device receives the appliance-specific content from the appliance manufacture when the selected function is enabled.

10. The method of claim 1, wherein the appliance service provider is an appliance servicer, and the user device receives the appliance-specific content from the appliance servicer when the selected function is enabled.

11. The method of claim 1, wherein the appliance service provider is an appliance distributor, and the user device receives the appliance-specific content from the appliance distributor when the selected function is enabled.

12. The method of claim 1, wherein the appliance service provider is an advertiser, and the user device receives the an advertisement from the advertiser when the selected function is enabled.

13. The method of claim 1, wherein the appliance service provider is an appliance manufacturer.

14. The method of claim 1, wherein the appliance-specific content includes a user manual.

15. The method of claim 1, wherein the appliance-specific content includes appliance warranty information.

16. The method of claim 1, wherein activating the appliance center feature comprises executing an appliance application on the user device.

17. The method of claim 16, wherein the appliance center setting is displayed in an interface of the appliance application.

18. An apparatus for receiving appliance-specific content, the apparatus comprising:

a user interface that:

receives a first user input, wherein the first received user input includes a selection of an appliance center setting, the selection identifying at least one appliance manufacturer from a plurality of appliance manufacturers, the appliance center setting included in operating system software, and receives a second user input, wherein the second received user input includes a selection of a function of a plurality of functions corresponding to the selected appliance manufacturer, the selected function included in the operating system software;

a communication interface that transmits information corresponding to the selected manufacturer and to the selected function for storage to a database of a third party platform; and a processor that executes instructions stored in memory, wherein the execution of the instructions by the processor:

activates an appliance center feature based on the first and second user inputs, and prepares appliance ownership data for transmission from the user device regarding an appliance based on the selected manufacturer and the selected function in response to an appliance search by the third party platform, wherein the appliance ownership data is transmitted to the third party platform for storage in the database, the communication interface receives appliance-specific content from a requesting appliance service provider identified as an allowed appliance service provider, and the third party platform:

receives an appliance search request including appliance-identifying information from the requesting appliance service provider, compares the appliance search request and the transmitted appliance ownership data to identify a match to the appliance, and allows the appliance-specific content to be transmitted from the requesting appliance service provider based on the identified match, wherein the content is specific to the matching appliance, and corresponds to the selected manufacturer and the selected function.

19. A non-transitory computer-readable storage medium having embodied thereon a program executable by a processor to perform a method for receiving appliance-specific content on a user device associated with an appliance, the method comprising:

receiving a first user input via a user interface at the user device, wherein the received user input includes a selection of an appliance center setting, the selection identifying at least one appliance manufacturer from a plurality of appliance manufacturers, the appliance center setting included in operating system software of the user device;

receiving a second user input via the user interface, wherein the second received user input includes a selection of a function of a plurality of functions corresponding to the selected appliance manufacturer, the selected function included in the operating system software of the user device;

transmitting information corresponding to the selected manufacturer and to the selected function for storage to a database of a third party platform, wherein the information corresponding to the selected manufacturer and to the selected function are transmitted over a network communication interface from the user device;

activating an appliance center feature on the user device based on the first and second user inputs;

transmitting appliance ownership data from the user device regarding an appliance based on the selected manufacturer and the selected function in response to an appliance search by the third party platform, wherein the transmitted appliance ownership data is provided for storage in the database; and receiving appliance-specific content from a requesting appliance service provider identified as an allowed appliance service provider, wherein the third party platform:

receives an appliance search request including appliance-identifying information from the requesting appliance service provider, compares the appliance search request and the transmitted appliance ownership data to identify a match to the appliance associated with the user device, and allows the appliance-specific content to be transmitted from the requesting appliance service provider based on the identified match, wherein the content is specific to the matching appliance, and corresponds to the selected manufacturer and the selected function.

* * * * *